US012322901B2

(12) United States Patent
Guo et al.

(10) Patent No.: US 12,322,901 B2
(45) **Date of Patent: *Jun. 3, 2025**

(54) STRAP CONNECTOR AND ASSEMBLY THEREOF WITH ENHANCED MATING RETENTION FORCE

(71) Applicant: LUXSHARE TECHNOLOGIES INTERNATIONAL, INC., Milpitas, CA (US)

(72) Inventors: Rongzhe Guo, Dongguan (CN); Hengshan Cheng, Dongguan (CN); Hongji Chen, Dongguan (CN); Yiheng Lin, Dongguan (CN)

(73) Assignee: LUXSHARE TECHNOLOGIES INTERNATIONAL, INC., Milpitas, CA (US)

( * ) Notice: Subject to any disclaimer, the term of this patent is extended or adjusted under 35 U.S.C. 154(b) by 412 days.

This patent is subject to a terminal disclaimer.

(21) Appl. No.: 17/834,523

(22) Filed: Jun. 7, 2022

(65) Prior Publication Data

US 2022/0407263 A1 Dec. 22, 2022

(30) Foreign Application Priority Data

Jun. 16, 2021 (CN) ......................... 202110665729.0

(51) Int. Cl.
*H01R 13/631* (2006.01)
*H01R 13/514* (2006.01)
*H01R 13/627* (2006.01)

(52) U.S. Cl.
CPC ......... *H01R 13/631* (2013.01); *H01R 13/514* (2013.01); *H01R 13/6275* (2013.01)

(58) Field of Classification Search
CPC ................ H01R 13/631; H01R 13/514; H01R 13/6275; H01R 13/6335
See application file for complete search history.

(56) References Cited

U.S. PATENT DOCUMENTS

2021/0135402 A1 5/2021 Li et al.
2022/0021157 A1* 1/2022 Sun ...................... H01R 13/631
2022/0190516 A1* 6/2022 Phillips .............. H01R 12/7005

FOREIGN PATENT DOCUMENTS

CN 2757373 Y 2/2006
CN 208228188 U 12/2018
(Continued)

OTHER PUBLICATIONS

Machine Translation of CN 112952421 ("Chen").*

*Primary Examiner* — Renee S Luebke
*Assistant Examiner* — Paul D Baillargeon
(74) *Attorney, Agent, or Firm* — Birch, Stewart, Kolasch & Birch, LLP

(57) ABSTRACT

A strap connector includes an insulating body, a number of conductive terminals, a movable component, an elastic member and a pull strap. The insulating body includes a main body portion having a first end wall and a second end wall. The movable component includes a first locking protrusion protruding beyond the first end wall. The pull strap is connected with the movable component. The pull strap is configured to drive the movable component to move in a moving direction. The strap connector includes a second locking protrusion protruding beyond the second end wall. The first locking protrusion and the second locking protrusion are adapted to lock with locking holes of a mating connector, thereby improving the mating retention force when mating with the mating connector. The present disclosure also discloses a strap connector assembly having the strap connector.

20 Claims, 12 Drawing Sheets

(56) References Cited

FOREIGN PATENT DOCUMENTS

| | | | |
|---|---|---|---|
| CN | 111129867 | A | 5/2020 |
| CN | 211829454 | U | 10/2020 |
| CN | 112490774 | A | 3/2021 |
| CN | 112886332 | A | 6/2021 |
| CN | 112962421 | A | 6/2021 |
| CN | 215184820 | U | 12/2021 |
| TW | M627362 | U | 5/2022 |

* cited by examiner

STRAP CONNECTOR AND ASSEMBLY THEREOF WITH ENHANCED MATING RETENTION FORCE

CROSS-REFERENCE TO RELATED APPLICATION

This patent application claims priority of a Chinese Patent Application No. 202110665729.0, filed on Jun. 16, 2021 and titled "STRAP CONNECTOR AND ASSEMBLY THEREOF", the entire content of which is incorporated herein by reference.

TECHNICAL FIELD

The present disclosure relates to a strap connector and an assembly thereof, which belongs to a technical field of connectors.

BACKGROUND

An existing strap connector assembly usually includes a strap connector and a mating connector. The strap connector includes an insulating body, a plurality of conductive terminals, a locking piece located on one side of the insulating body, and a pull strap connected with the locking piece. The locking piece is provided with a locking protrusion on one side of the insulating body. The mating connector is provided with a locking slot matched with the locking protrusion.

However, the single-sided locking features in the prior art have a weak holding force when the strap connector and the mating connector are mated with each other, and are likely to affect data transmission due to looseness.

SUMMARY

An object of the present disclosure is to provide a strap connector and an assembly thereof which have a stronger mating retention force.

In order to achieve the above object, the present disclosure adopts the following technical solution: a strap connector, including: an insulating body, the insulating body including a main body portion and a tongue plate extending beyond the main body portion along a mating direction, the main body portion including a first end wall and a second end wall opposite to the first end wall; a plurality of conductive terminals, each conductive terminal including a mating portion exposed from the tongue plate; a movable component, the movable component being at least partially installed in the main body portion, the movable component including a first locking protrusion protruding beyond the first end wall; an elastic member, the elastic member abutting against the movable component; and a pull strap, the pull strap being connected with the movable component, the pull strap being configured to drive the movable component to overcome a force of the elastic member, so that the movable component moves along a moving direction perpendicular to the mating direction; wherein the strap connector includes a second locking protrusion protruding beyond the second end wall, and the first locking protrusion and the second locking protrusion are adapted to lock with locking holes of a mating connector.

In order to achieve the above object, the present disclosure adopts the following technical solution: a strap connector assembly, including: a strap connector, the strap connector including: an insulating body, the insulating body including a main body portion and a tongue plate extending beyond the main body portion along a mating direction, the main body portion including a first end wall and a second end wall opposite to the first end wall; a plurality of conductive terminals, each conductive terminal including a mating portion exposed from the tongue plate; a movable component, the movable component being at least partially installed in the main body portion, the movable component including a first locking protrusion protruding beyond the first end wall; an elastic member, the elastic member abutting against the movable component; and a pull strap, the pull strap being connected with the movable component, the pull strap being configured to drive the movable component to overcome a force of the elastic member, so that the movable component moves along a moving direction perpendicular to the mating direction; wherein the strap connector includes a second locking protrusion protruding beyond the second end wall; and a mating connector, the mating connector including: a mating insulating body, the mating insulating body defining a mating slot to receive the tongue plate; a plurality of mating terminals fixed to the mating insulating body, each mating terminal including an elastic mating arm which extends into the mating slot and is adapted to contact the mating portion; and a metal shell enclosing the mating insulating body, the metal shell including a first side wall, a second side wall disposed opposite to the first side wall, and locking holes, the locking holes including a first locking hole provided on the first side wall to mate with the first locking protrusion, the second side wall including an elastic arm, the locking holes further including a second locking hole provided on the elastic arm to mate with the second locking protrusion; wherein the movable component includes an ejector rod, the ejector rod is configured to protrude beyond the second end wall when the movable component moves along the moving direction, so as to unlock the second locking protrusion, the ejector rod is configured to push the elastic arm when the movable component moves in the moving direction, so that the second locking protrusion and the second locking hole are separated from each other.

Compared with the prior art, the present disclosure provides the first locking protrusion and the second locking protrusion respectively protruding beyond opposite sides of the insulating body, so that the strap connector can be locked with the mating connector from both sides. As a result, the mating retention force is improved, and the risk of loosening of the strap connector and the mating connector is reduced.

DETAILED DESCRIPTION

Figure 1:
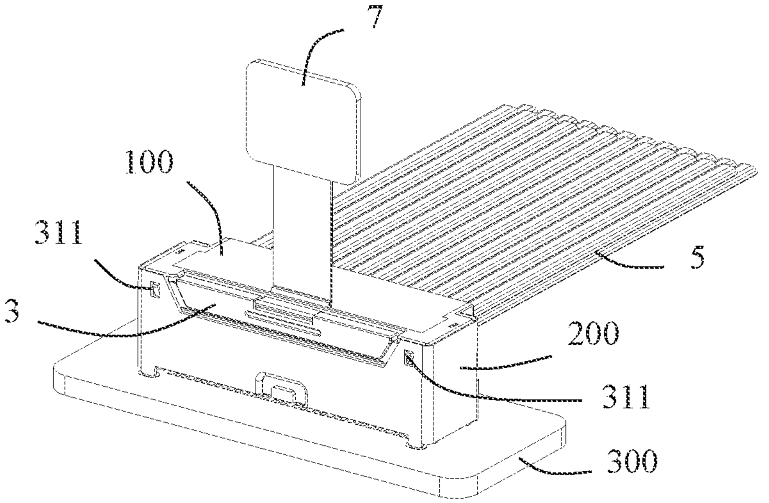
FIG. 1 is a perspective schematic view of a strap connector assembly in accordance with an embodiment of the present disclosure, in which a strap connector is mating with a mating connector, and the mating connector is mounted to a circuit board.
Figure 2:
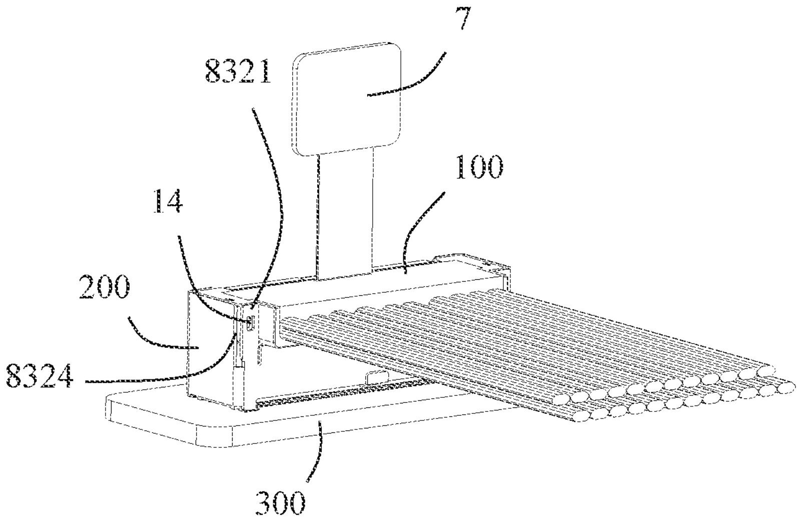
FIG. 2 is a perspective schematic view of FIG. 1 from another angle.
Figure 3:
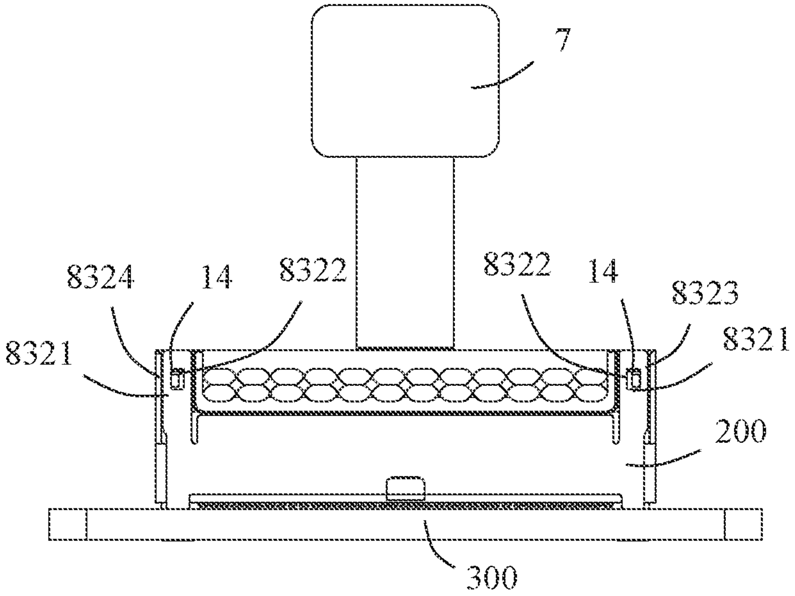
FIG. 3 is a rear view of FIG. 1.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Figure 4:
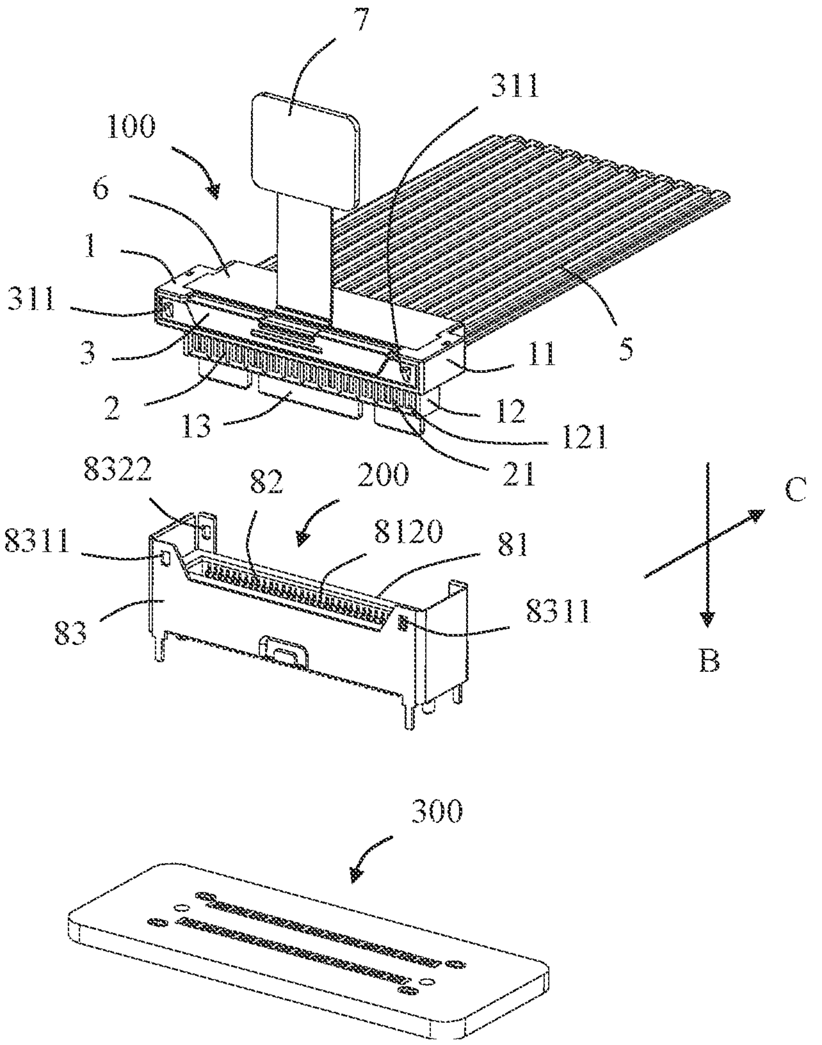
FIG. 4 is a partially exploded perspective view of FIG. 1.

Referring to FIGS. 1 to 6, the present disclosure discloses a strap connector assembly including a strap connector 100 and a mating connector 200 for mating with the strap connector 100. In an illustrated embodiment of the present disclosure, the strap connector 100 is a cable connector, and the mating connector 200 is a board-end connector for being mounted to a circuit board 300. Referring to FIG. 4, the strap connector 100 is adapted to mate with the mating connector 200 along a mating direction B (i.e., a top-to-bottom direction) to realize data transmission.

Referring to FIGS. 3 to 11, the strap connector 100 includes an insulating body 1, a plurality of conductive terminals 2 fixed to the insulating body 1, a movable component 3 installed in the insulating body 1, an elastic member 4 to abut against the movable component 3, a cable 5 electrically connected to the conductive terminals 2, a cover plate 6 fixed to the insulating body 1 and at least partially abutting against the cable 5, and a pull strap 7 connected to the movable component 3. The pull strap 7 is configured to drive the movable component 3 to overcome a force of the elastic member 4, so that the movable component 3 moves along a moving direction C perpendicular to a mating direction B (referring to FIG. 3).

In the illustrated embodiment of the present disclosure, the insulating body 1 includes a main body portion 11, a tongue plate 12 protruding downwardly beyond the main body portion 11 along the mating direction B, and a positioning plate 13 further protruding downwardly beyond the tongue plate 12 along the mating direction B. In the illustrated embodiment of the present disclosure, a size of the main body portion 11 in a front-rear direction, a size of the tongue plate 12 in the front-rear direction, and a size of the positioning plate 13 in the front-rear direction become smaller in sequence, so that the insulating body 1 is of a roughly stepped configuration. In the illustrated embodiment of the present disclosure, referring to FIGS. 4 and 5, the positioning plate 13 includes a first positioning piece 131 located in the middle, a second positioning piece 132 located on one side of the first positioning piece 131 and spaced apart from the first positioning piece 131, and a third positioning piece 133 located on the other side of the first positioning piece 131 and spaced apart from the first positioning piece 131. A size of the first positioning piece 131 in the left-right direction is larger than a size of the second positioning piece 132 in the left-right direction. A size of the first positioning piece 131 in the left-right direction is also larger than a size of the third positioning piece 133 in the left-right direction. In the illustrated embodiment of the present disclosure, a distance between the first positioning piece 131 and the second positioning piece 132 is different from a distance between the first positioning piece 131 and the third positioning piece 133. This arrangement can play a role in preventing foolishness and prevent the strap connector 100 from being inserted into the mating connector 200 at a wrong angle.

Figure 6:
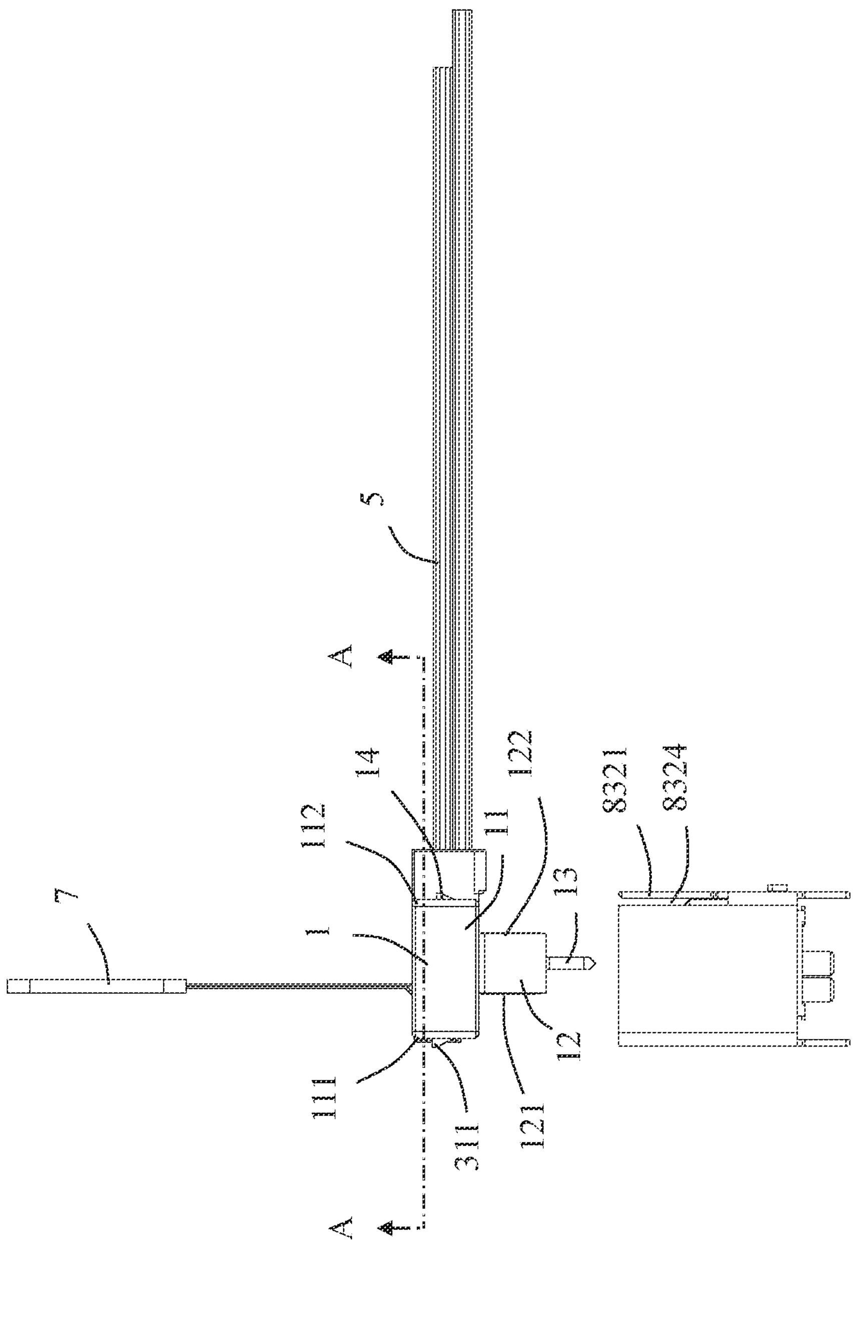
FIG. 6 is a right side view of the strap connector assembly in FIG. 4 after removing the circuit board.
Figure 7:
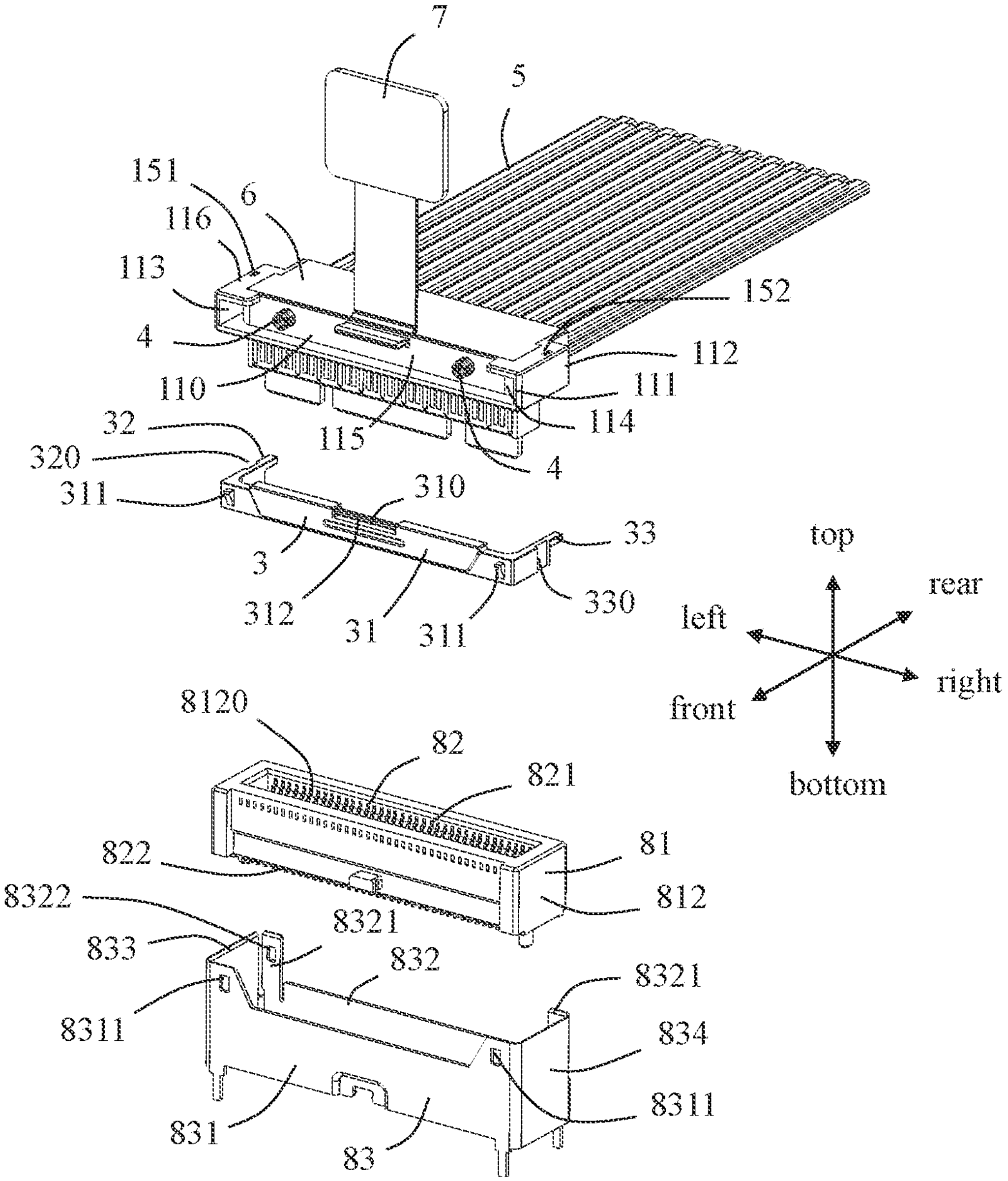
FIG. 7 is a further perspective exploded view of the strap connector assembly of the present disclosure.

Referring to FIGS. 6 and 7, the main body portion 11 includes a first end wall 111 (i.e., a front end wall), a second end wall 112 (i.e., a rear end wall) opposite to the first end wall 111, a receiving space 110 extending forwardly through the first end wall 111, a first receiving groove 113 located on one side (i.e., a left side) of the receiving space 110, and a second receiving groove 114 located on the other side (i.e., a right side) of the receiving space 110. The receiving space 110 does not extend backwardly through the second end wall 112. The main body portion 11 includes an inner wall surface 115 exposed to the receiving space 110. The first receiving groove 113 and the second receiving groove 114 extend through the second end wall 112 along the moving direction C.

Figure 9:
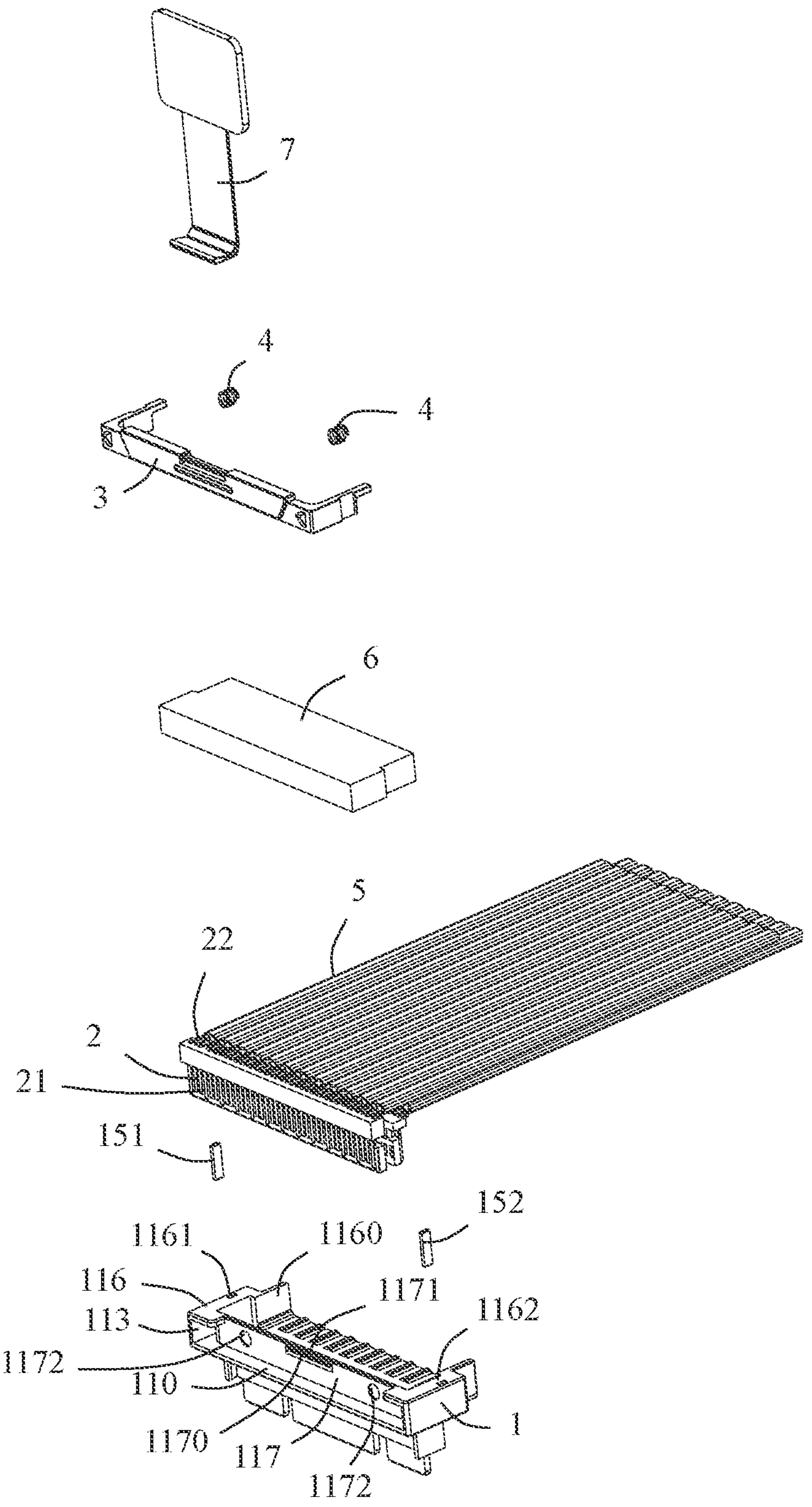
FIG. 9 is a further perspective exploded view of the strap connector in FIG. 8.
Figure 10:
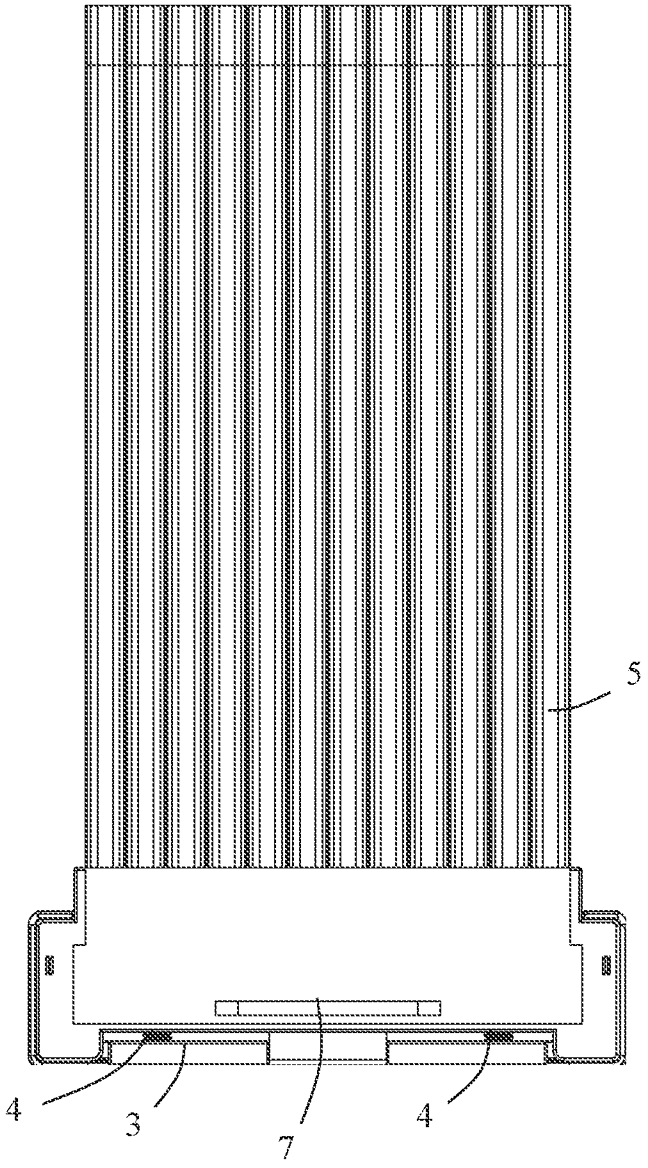
FIG. 10 is a top view of the strap connector in FIG. 4.

Besides, as shown in FIG. 9, the main body portion 11 also includes a top surface 116, an opening 1160 extending upwardly through the top surface 116, a first mounting hole 1161 extending upwardly through the top surface 116 and located on one side of the opening 1160, and a second mounting hole 1162 extending upwardly through the top surface 116 and located on the other side of the opening 1160. The main body portion 11 further includes a fixing plate 117 located between the first end wall 111 and the second end wall 112. In the illustrated embodiment of the present disclosure, the fixing plate 117 is a vertical plate. The fixing plate 117 includes a strap groove 1170 extending through the fixing plate 117 along the moving direction C and a strap shaft 1171 located between an edge (i.e., an upper edge) of the fixing plate 117 and the strap groove 1170. The pull strap 7 extends through the strap groove 1170 along the moving direction C from a position where it is connected with the movable component 3. The pull strap 7 is bent around the strap shaft 1171 and then extends beyond the main body portion 11. The fixing plate 117 further includes a receiving hole 1172. In the illustrated embodiment of the present disclosure, two receiving holes 1172 are provided. The receiving holes 1172 are recessed on a surface of the fixing plate 117 facing the movable component 3. That is, the receiving holes 1172 are exposed on the surface of the fixing plate 117 facing the movable component 3. One end of the elastic member 4 is disposed in the corresponding receiving hole 1172, and the other end of the elastic member 4 abuts against the movable component 3.

Figure 5:
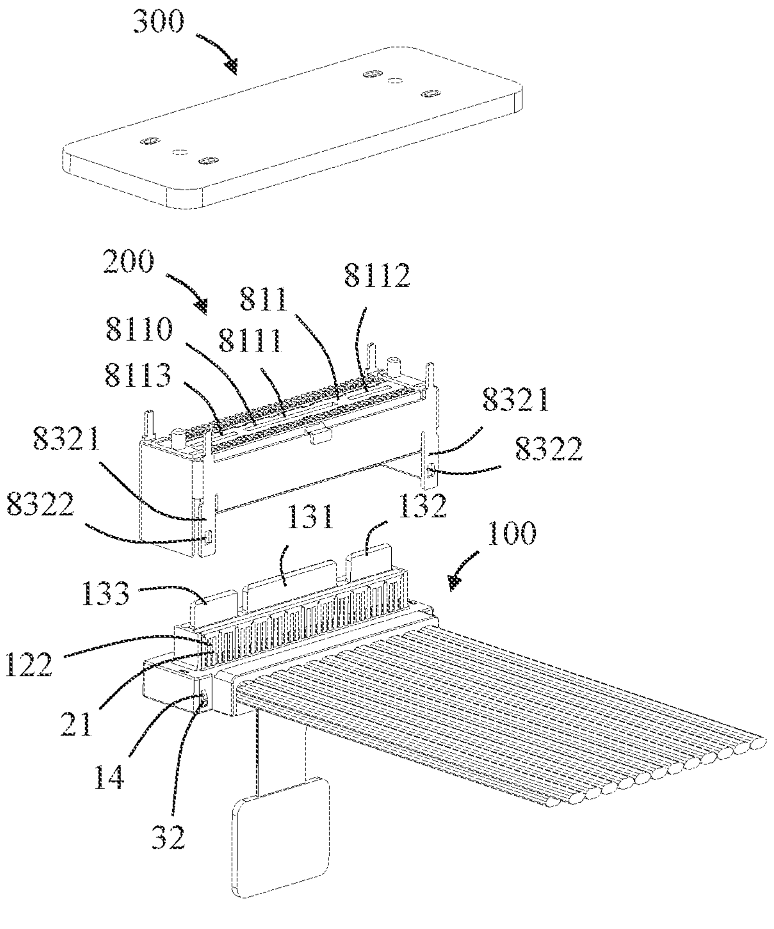
FIG. 5 is a partially exploded perspective view of FIG. 4 from another angle.

Referring to FIGS. 4 to 6, the tongue plate 12 includes a first surface 121 and a second surface 122 opposite to each other.

Each conductive terminal 2 includes a mating portion 21 exposed from the tongue plate 12 and a connection portion 22 electrically connected to the cable 5 (referring to FIG. 9). In the illustrated embodiment of the present disclosure, each mating portion 21 has a flat plate shape. The mating portions 21 of the conductive terminals 2 are exposed from the first surface 121 and the second surface 122, respectively. In an embodiment of the present disclosure, the conductive terminals 2 are insert-molded with the insulating body 1. Of course, in other embodiments, the conductive terminals 2 can also be directly assembled to the insulating body 1. Or, the conductive terminals 2 and an insulating block are combined to form a terminal module before being assembled to the insulating body 1. The fixing methods of the conductive terminals 2 and the insulating body 1 are well-known to those skilled in the art, which will not be repeated in the present disclosure.

In the illustrated embodiment of the present disclosure, the cable 5 extends beyond the main body portion 11 along the moving direction C.

Figure 11:
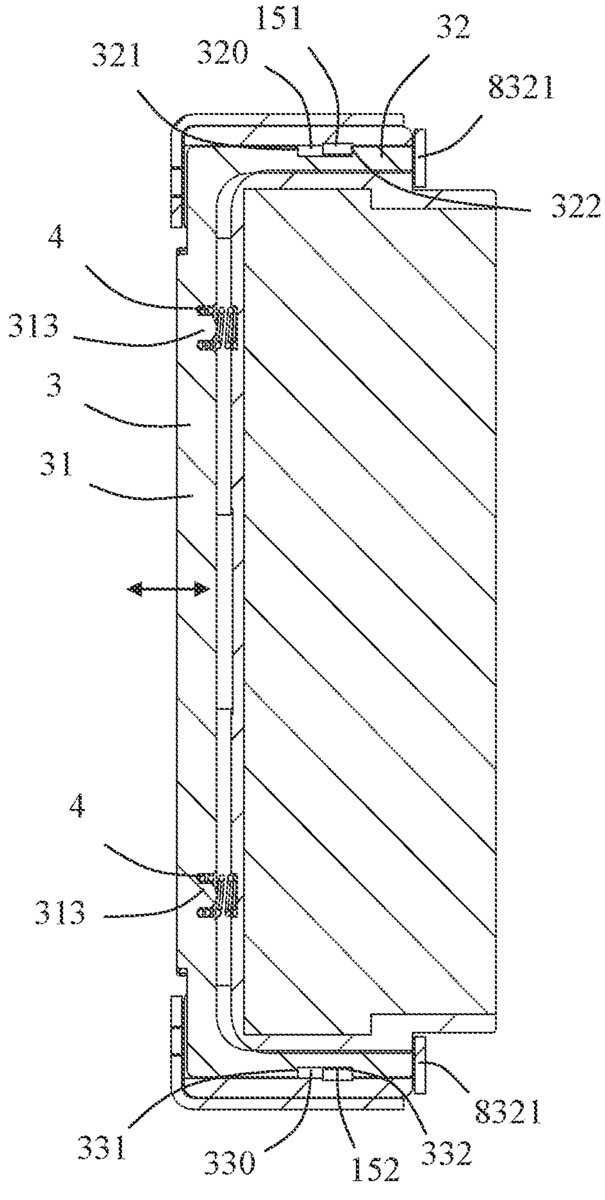
FIG. 11 is a schematic cross-sectional view taken along line A-A in FIG. 6.

Referring to FIGS. 7 and 11, the movable component 3 is at least partially installed in the main body portion 11. Specifically, the movable component 3 includes a base portion 31 received in the receiving space 110, a first ejector rod 32 extending from one side of the base portion 31 and received in the first receiving groove 113, and a second ejector rod 33 extending from the other side of the base portion 31 and received in the second receiving groove 114.

The base portion 31 includes a first locking protrusion 311 protruding forwardly beyond the first end wall 111. In the illustrated embodiment of the present disclosure, two first locking protrusions 311 are provided, which are respectively located on opposite sides (i.e., a left side and a right side) of the base portion 31 so as to improve a mating retention force. In the illustrated embodiment of the present disclosure, the first locking protrusion 311 is integrally formed with the main body portion 11. Of course, in other embodiments, the first locking protrusion 311 can also be manufactured separately from the main body portion 11, and then assembled and fixed together. Under this circumstance, the first locking protrusion 311 may be made of a material different from that of the main body portion 11, for example, a wear-resistant material with better structural strength. The base portion 31 is also provided with a strap connection portion 312. The pull strap 7 is connected to the strap connection portion 312. The strap connection portion 312 includes a cutout 310 extending through the base portion along the moving direction C. The strap connection portion 312 is located above the cutout 310. The strap connection portion 312 is similar to a shaft portion, and is located between the cutout 310 and an edge (i.e., an upper edge) of the base portion 31. One end of the pull strap 7 passes through the through slot 310 and is sleeved around the pull strap connection portion 312.

In the illustrated embodiment of the present disclosure, the elastic member 4 is a compression spring installed between the base portion 31 and the inner wall surface 115 of the main body portion 11. In the illustrated embodiment of the present disclosure, two compression springs are provided and arranged side by side so as to improve the stability of the movable component 3 when moving. In addition, in order to better position the compression spring, the base portion 31 is further provided with a positioning post 313 (referring to FIG. 11) at least partially inserted into the compression spring.

The strap connector 100 includes a second locking protrusion 14 protruding backwardly beyond the second end wall 112. In the illustrated embodiment of the present disclosure, two second locking protrusions 14 are provided and located on opposite sides (i.e., a left side and a right side) of the second end wall 112 so as to improve the mating retention force. In the illustrated embodiment of the present disclosure, the second locking protrusion 14 and the main body portion 11 are integrally formed to save cost. Of course, in other embodiments, the second locking protrusion 14 can also be made separately from the main body portion 11, and then assembled and fixed together. Under this circumstance, the second locking protrusion 14 may be made of a material different from that of the main body portion 11. The first locking protrusion 311 and the second locking protrusion 14 are adapted to lock with locking holes of the mating connector 200 to improve the mating retention force, which will be described in detail later.

Figure 8:
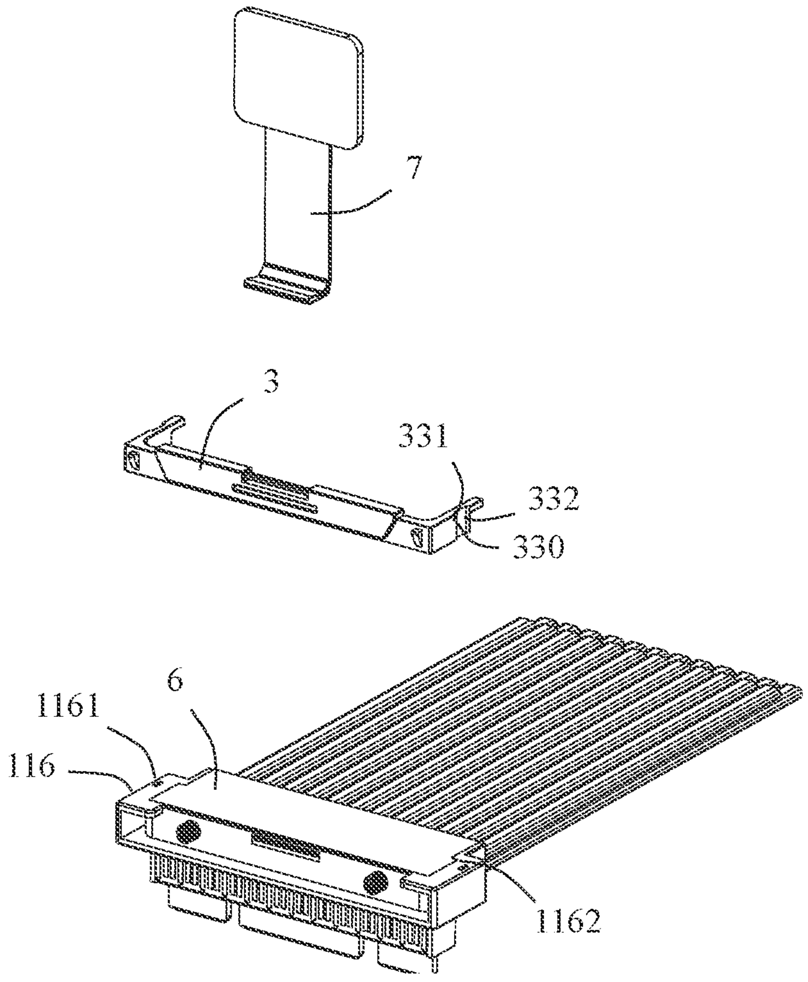
FIG. 8 is a further perspective exploded view of the strap connector in FIG. 7.

Referring to FIGS. 7, 8 and 11, the first ejector rod 32 includes a first groove 320, a first limiting surface 321 located at one end of the first groove 320 along the moving direction C, and a second limiting surface 322 located at the other end of the first groove 320 along the moving direction C. The first limiting surface 321 is closer to the first end wall 111 than the second limiting surface 322.

Similarly, the second ejector rod 33 includes a second groove 330, a third limiting surface 331 located at one end of the second groove 330 along the moving direction C, and a fourth limiting surface 332 located at the other end of the second groove 330 along the moving direction C. The third limiting surface 331 is closer to the first end wall 111 than the fourth limiting surface 332.

The strap connector 100 includes a first pin 151 and a second pin 152 fixed in the first mounting hole 1161 and the second mounting hole 1162, respectively. The first pin 151 is inserted into the first groove 320. The second pin 152 is inserted into the second groove 330. A size of the first groove 320 along the moving direction C is larger than a size of the first pin 151 along the moving direction C. A size of the second groove 330 along the moving direction C is greater than a size of the second pin 152 along the moving direction C. The first limiting surface 321 is adapted to abut against the first pin 151, and the third limiting surface 331 is adapted to abut against the second pin 152, so as to prevent the movable component 3 from moving excessively along the moving direction C under the action of the pull strap 7. The second limiting surface 322 is adapted to abut against the first pin 151, and the fourth limiting surface 332 is adapted to abut against the second pin 152, so as to prevent the movable component 3 from returning excessively along a direction opposite to the moving direction C when the elastic member 4 releases a restoring force.

The cover plate 6 is received and fixed in the opening 1160 of the main body portion 11. The pull strap 7 extends beyond the cover plate 6. In an embodiment of the present disclosure, the cover plate 6 presses against connection portions between the cable 5 and the conductive terminals 2 (i.e., soldering portions of the cable 5 and the conductive terminals 2) so as to play a protective role.

Referring to FIGS. 2 to 7 and 12, the mating connector 200 includes a mating insulating body 81, a plurality of mating terminals 82 fixed to the mating insulating body 81, and a metal shell 83 enclosing the mating insulating body 81. The mating insulating body 81 includes a bottom wall 811 and a plurality of side walls 812 perpendicular to the bottom wall 811. Referring to FIG. 5, the bottom wall 811 includes a positioning groove 8110 for receiving the positioning plate 13. Specifically, the positioning groove 8110 includes a first positioning groove 8111 accommodating the first positioning piece 131, a second positioning groove 8112 accommodating the second positioning piece 132, and a third positioning groove 8113 accommodating the third positioning piece 133. In the illustrated embodiment of the present disclosure, the first positioning groove 8111, the second positioning groove 8112 and the third positioning groove 8113 extend through the bottom wall 811.

Figure 12:
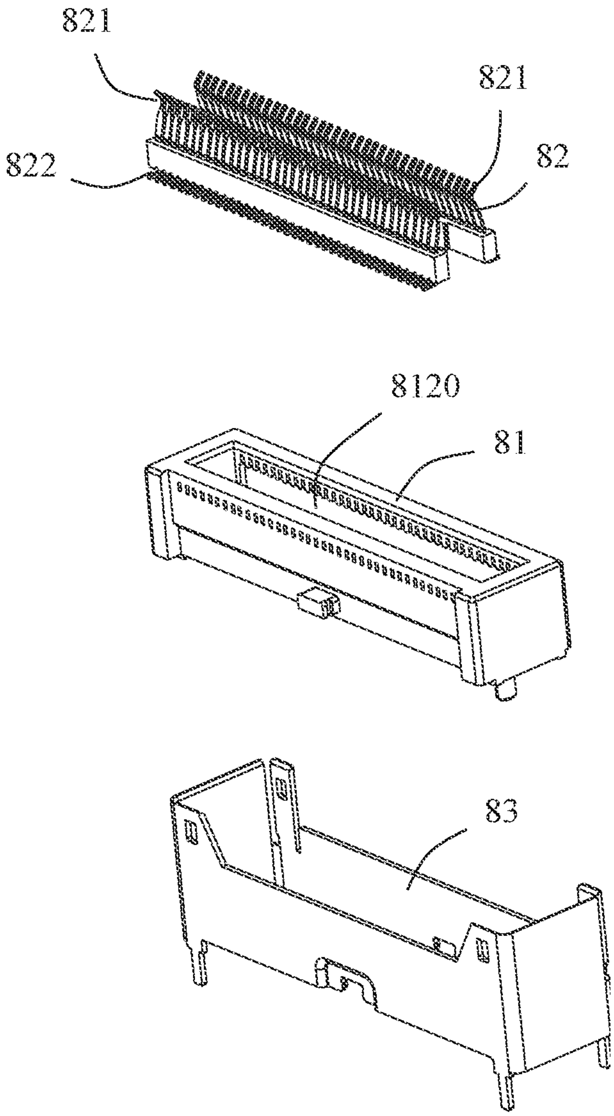
FIG. 12 is a further perspective exploded view of the mating connector in FIG. 7.

Referring to FIGS. 7 and 12, the side walls 812 are enclosed to form a mating slot 8120 for receiving the tongue plate 12. The mating terminals 82 are arranged in two rows. Each mating terminal 82 includes an elastic mating arm 821 and a mounting tail 822 for being mounted to the circuit board 300. The elastic mating arm 821 extends into the mating slot 8120 and is adapted to contact the mating portion 21.

The metal shell 83 includes a first side wall 831, a second side wall 832 disposed opposite to the first side wall 831, a first connecting wall 833 connecting one side of the first side wall 831 and one side of the second side wall 832, and a second connecting wall 834 connecting the other side of the first side wall 831 and the other side of the second side wall 832. The first side wall 831 is provided with a first locking hole 8311 which mates with the first locking protrusion 311. The second side wall 832 is provided with an elastic arm 8321. The elastic arm 8321 is provided with a second locking hole 8322 which mates with the second locking protrusion 14. In the illustrated embodiment of the present disclosure, the elastic arm 8321 is of a cantilevered configuration, which can be elastically deformed under the action of an external force, and return to a position after the external force is released. In the illustrated embodiment of the present disclosure, two elastic arms 8321 are provided and located on left and right sides of the second side wall 832, respectively. There is a first slot 8323 between the elastic arm 8321 close to the first connecting wall 833 and the first connecting wall 833. There is a second slot 8324 between the elastic arm 8321 close to the second connecting wall 834 and the second connecting wall 834 (referring to FIG. 3). By providing the first slot 8323 and the second slot 8324, the corresponding elastic arm 8321 has better elastic deformation ability.

When the strap connector 100 is inserted into the mating connector 200, the positioning plate 13 corresponds to the positioning groove 8110, the tongue plate 12 corresponds to the mating slot 8120, and the mating portions 21 of the conductive terminals 2 correspond to the elastic mating arms 821 of the mating terminals 82. With the insertion of the strap connector 100, inclined surfaces of the first locking protrusion 311 and the second locking protrusion 14 abut against the first side wall 831 and the second side wall 832, respectively. The movable component 3 overcomes the force of the elastic member 4 and shrinks inwardly along the moving direction C by a certain distance. When the first locking protrusion 311 and the second locking protrusion 14 move downwardly to correspond to the first locking hole 8311 and the second locking hole 8322, the elastic member 4 restores elasticity. This causes the movable component 3 return in a direction opposite to the moving direction C. At this time, the first locking protrusion 311 and the second locking protrusion 14 protrude forwardly and backwardly into the first locking hole 8311 and the second locking hole 8322, respectively to realize the locking of the strap connector 100 and the mating connector 200. Compared with the prior art, the present disclosure can realize double-sided locking by arranging the first locking protrusion 311 and the second locking protrusion 14 on both sides. Therefore, the mating retention force is improved, and the risk of loosening of the strap connector 100 and the mating connector 200 is reduced.

When unlocking is required, an external force is applied to pull the pull strap 7. The pull strap 7 generates a force component along the moving direction C. The component force in this direction overcomes the force of the elastic member 4 and causes the movable component 3 to move along the moving direction C. At this time, on one hand, the first locking protrusion 311 escapes from the first locking hole 8311; and on the other hand, the first ejector rod 32 and the second ejector rod 33 extend rightward and protrude beyond the second end wall 112 so as to push the corresponding elastic arms 8321 to deform outward, thereby causing the second locking protrusion 14 escape from the second locking hole 8322. In other words, at this time, the strap connector 100 and the mating connector 200 are unlocked on both sides. The strap connector 100 can be pulled out of the mating connector 200 by applying other forces or by an upward component force applied to the strap 7.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A strap connector, comprising:

an insulating body, the insulating body comprising a main body portion and a tongue plate extending beyond the main body portion along a mating direction, the main body portion comprising a first end wall, a second end wall opposite to the first end wall and a receiving space extending through the first end wall;

a plurality of conductive terminals, each conductive terminal comprising a mating portion exposed from the tongue plate;

a movable component, the movable component being at least partially installed in the main body portion, the movable component being of an integral configuration and comprising two first locking protrusions protruding beyond the first end wall;

an elastic member, the elastic member abutting against the movable component; and a pull strap, the pull strap being connected with the movable component, the pull strap being configured to drive the movable component to overcome a force of the elastic member, so that the movable component moves along a moving direction perpendicular to the mating direction; the receiving space extending through the first end wall along the moving direction; the elastic member abutting against the movable component along the moving direction;

wherein the strap connector comprises a second locking protrusion protruding beyond the second end wall, and the first locking protrusions and the second locking protrusion are adapted to lock with locking holes of a mating connector.

2. The strap connector according to claim 1, wherein the main body portion further comprises a fixing plate located between the first end wall and the second end wall, the fixing plate comprises a strap groove extending through the fixing plate along the moving direction and a strap shaft located between an edge of the fixing plate and the strap groove, the pull strap extends through the strap groove in the moving direction from a position where it is connected with the movable component, and the pull strap is bent around the strap shaft and then extends beyond the main body portion.

3. The strap connector according to claim 2, wherein the fixing plate further comprises a receiving hole which is recessed on a surface of the fixing plate facing the movable component; and wherein one end of the elastic member is arranged in the receiving hole, and an another end of the elastic member abuts against the movable component.

4. The strap connector according to claim 1, wherein the movable component comprises an ejector rod, the ejector rod is configured to protrude beyond the second end wall when the movable component moves in the moving direction, so as to unlock the second locking protrusion.

5. The strap connector according to claim 4, further comprising a pin fixed in the insulating body, wherein the ejector rod comprises a groove, the pin is inserted into the groove, and a size of the groove in the moving direction is larger than a size of the pin in the moving direction.

6. The strap connector according to claim 5, wherein the ejector rod further comprises a first limiting surface located at one end of the groove along the moving direction and a second limiting surface located at an another end of the groove along the moving direction, the first limiting surface is closer to the first end wall than the second limiting surface, the first limiting surface is adapted to abut against the pin so as to prevent the movable component from moving excessively under the action of the pull strap, the second limiting surface is adapted to abut against the pin so as to prevent the movable component from returning excessively when the elastic member releases a restoring force.

7. The strap connector according to claim 4, wherein the main body portion defines a first receiving groove located on one side of the receiving space and a second receiving groove located on an another side of the receiving space, the first receiving groove and the second receiving groove extend through the second end wall along the moving direction;

wherein the movable component comprises a first ejector rod extending from one side of the base portion and received in the first receiving groove, and a second ejector rod extending from an another side of the base portion and received in the second receiving groove, the ejector rod comprises the first ejector rod and the second ejector rod; and wherein the elastic member is a compression spring installed between the base portion and the main body portion.

8. The strap connector according to claim 7, wherein the first locking protrusions are respectively located on opposite sides of the base portion; and wherein the number of the second locking protrusions is two and the second locking protrusions are located on opposite sides of the second end wall.

9. The strap connector according to claim 7, wherein the base portion comprises a strap connection portion, the pull strap is connected to the strap connection portion, the strap connector comprises a cover plate fixed to the main body portion, and the pull strap extends beyond the cover plate.

10. The strap connector according to claim 9, further comprising a cable electrically connected to the conductive terminals, the cable extending beyond the main body portion along the moving direction, and the cover plate pressing against connection portions between the cable and the conductive terminals.

11. A strap connector assembly, comprising:

a strap connector, the strap connector comprising:

an insulating body, the insulating body comprising a main body portion and a tongue plate extending beyond the main body portion along a mating direction, the main body portion comprising a first end wall and a second end wall opposite to the first end wall;

a plurality of conductive terminals, each conductive terminal comprising a mating portion exposed from the tongue plate;

a movable component, the movable component being at least partially installed in the main body portion, the movable component comprising a first locking protrusion protruding beyond the first end wall;

an elastic member, the elastic member abutting against the movable component; and a pull strap, the pull strap being connected with the movable component, the pull strap being configured to drive the movable component to overcome a force of the elastic member, so that the movable component moves along a moving direction perpendicular to the mating direction;

wherein the strap connector comprises a second locking protrusion protruding beyond the second end wall; and a mating connector, the mating connector comprising:

a mating insulating body, the mating insulating body defining a mating slot to receive the tongue plate;

a plurality of mating terminals fixed to the mating insulating body, each mating terminal comprising an elastic mating arm which extends into the mating slot and is adapted to contact the mating portion; and a metal shell enclosing the mating insulating body, the metal shell comprising a first side wall, a second side wall disposed opposite to the first side wall, and locking holes, the locking holes comprising a first locking hole provided on the first side wall to mate with the first locking protrusion, the second side wall comprising an elastic arm, the locking holes further comprising a second locking hole provided on the elastic arm to mate with the second locking protrusion;

wherein the movable component comprises an ejector rod, the ejector rod is configured to protrude beyond the second end wall when the movable component moves along the moving direction, so as to unlock the second locking protrusion, the ejector rod is configured to push the elastic arm when the movable component moves in the moving direction, so that the second locking protrusion and the second locking hole are separated from each other.

12. The strap connector assembly according to claim 11, wherein the main body portion further comprises a fixing plate located between the first end wall and the second end wall, the fixing plate comprises a strap groove extending through the fixing plate along the moving direction and a strap shaft located between an edge of the fixing plate and the strap groove, the pull strap extends through the strap groove in the moving direction from a position where it is connected with the movable component, and the pull strap is bent around the strap shaft and then extends beyond the main body portion.

13. The strap connector assembly according to claim 12, wherein the fixing plate further comprises a receiving hole which is recessed on a surface of the fixing plate facing the movable component; and wherein one end of the elastic member is arranged in the receiving hole, and an another end of the elastic member abuts against the movable component.

14. The strap connector assembly according to claim 11, wherein the ejector rod comprises a groove, the strap connector further comprises a pin fixed in the insulating body, the pin is inserted into the groove, and a size of the groove in the moving direction is larger than a size of the pin in the moving direction.

15. The strap connector assembly according to claim 14, wherein the ejector rod further comprises a first limiting surface located at one end of the groove along the moving direction and a second limiting surface located at an another end of the groove along the moving direction, the first limiting surface is closer to the first end wall than the second limiting surface, the first limiting surface is adapted to abut against the pin so as to prevent the movable component from moving excessively under the action of the pull strap, the second limiting surface is adapted to abut against the pin so as to prevent the movable component from returning excessively when the elastic member releases a restoring force.

16. The strap connector assembly according to claim 11, wherein the main body portion comprises a receiving space extending through the first end wall, a first receiving groove located on one side of the receiving space, and a second receiving groove located on an another side of the receiving space, the first receiving groove and the second receiving groove extend through the second end wall along the moving direction;

wherein the movable component comprises a base portion received in the receiving space, a first ejector rod extending from one side of the base portion and received in the first receiving groove, and a second ejector rod extending from an another side of the base portion and received in the second receiving groove, the ejector rod comprises the first ejector rod and the second ejector rod; and wherein the elastic member is a compression spring installed between the base portion and the main body portion.

17. The strap connector assembly according to claim 16, wherein the number of the first locking protrusions is two and the first locking protrusions are respectively located on opposite sides of the base portion; and wherein the number of the second locking protrusions is two and the second locking protrusions are located on opposite sides of the second end wall.

18. The strap connector assembly according to claim 16, wherein the base portion comprises a strap connection portion, the pull strap is connected to the strap connection portion, the strap connector comprises a cover plate fixed to the main body portion, and the pull strap extends beyond the cover plate.

19. The strap connector assembly according to claim 18, wherein the strap connector further comprises a cable electrically connected to the conductive terminals, the cable extends beyond the main body portion along the moving direction, and the cover plate presses against connection portions between the cable and the conductive terminals.

20. A strap connector, comprising:

an insulating body, the insulating body comprising a main body portion and a tongue plate extending beyond the main body portion along a mating direction, the main body portion comprising a first end wall, a second end wall disposed opposite to the first end wall and a receiving space extending through the first end wall;

a plurality of conductive terminals exposed on the tongue plate;

a movable component, the movable component being of an integral U-shaped configuration, the movable component comprising a base portion movably received in the receiving space, a first ejector rod extending from one side of the base portion and a second ejector rod extending from another side of the base portion; the base portion being provided with a pair of first locking protrusions protruding beyond the first end wall;

an elastic member, the elastic member abutting against the movable component; and a pull strap, the pull strap being connected with the movable component, the pull strap being configured to drive the movable component to be movable along a moving direction perpendicular to the mating direction; the receiving space extending through the first end wall along the moving direction;

wherein the strap connector comprises a pair of second locking protrusions protruding beyond the second end wall, and the first locking protrusions and the second locking protrusions protrude oppositely along the moving direction and are configured to lock with first locking holes and second locking holes of a mating connector, respectively;

when the movable component is driven by the pull strap to move along the moving direction, the first locking protrusions are separated from the first locking holes, the first ejector rod and the second ejector rod are driven to push against the mating connector so as to separate the second locking protrusions from the second locking holes, thereby unlocking the strap connector and the mating connector.

* * * * *